Jan. 2, 1940.          A. RAFTER          2,185,475
STUD AND RAFTER
Original Filed April 20, 1938
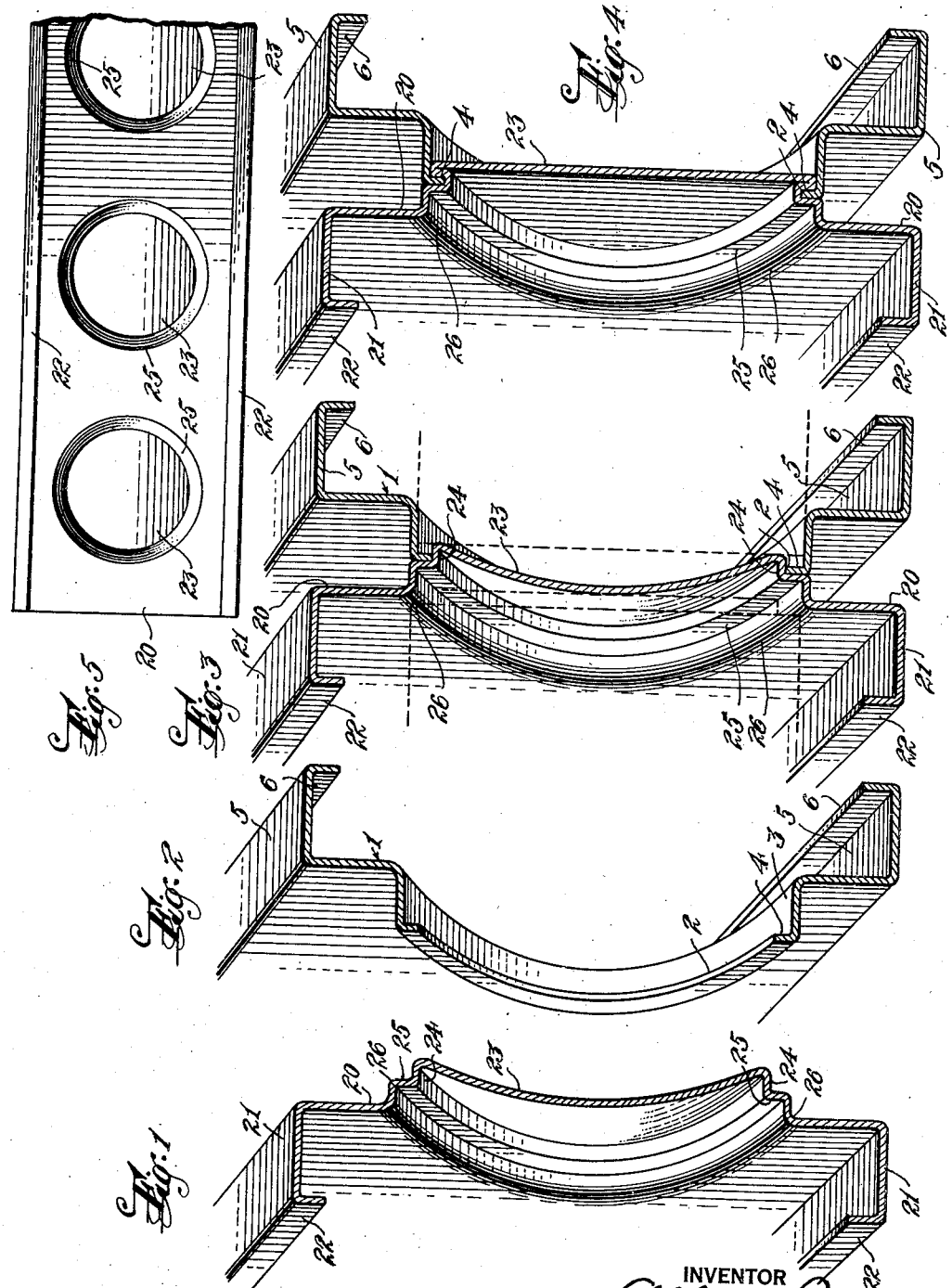

Patented Jan. 2, 1940

2,185,475

UNITED STATES PATENT OFFICE 2,185,475

STUD AND RAFTER

Albert Rafter, Glen Ridge, N. J., assignor to Rafter Machine Company, Belleville, N. J., a partnership composed of Albert Rafter and John C. Rafter, Jr.

Original application April 20, 1938, Serial No. 203,022. Divided and this application November 16, 1938, Serial No. 240,637

2 Claims. (Cl. 189—37)

This application is a division of my co-pending application filed April 20, 1938, under Serial #203,022.

This invention relates to improvements in structural members for use in building construction, and to a method of making the same from sheet metal.

In building construction, it is desirable that metal studs, rafters, beams and the like, be as light in weight as possible, and at the same time provide the necessary strength. It has been found advantageous to make such members from sheet metal, but structures heretofore provided have been objectionable in that they were made from complicated forms, and in many instances required welding or the like for joining elements thereof together.

It is an object of this invention to provide a metallic member for building construction which can be made from two plates of sheet metal securely joined together in a novel manner to provide a rigid structure of light weight and great strength.

A further object of the invention is to provide in a metal structural member, a joint for securing two plates of sheet metal together in a positive and permanent manner.

These and other advantageous objects, which will later appear, are accomplished by the simple and practical construction and arrangements of parts hereinafter described and exhibited in the accompanying drawing, forming part hereof, and in which:

Fig. 1 is a sectional view of an element used in making a metallic structural member in accordance with the invention, Fig. 2 is a sectional view of another element used in the making of the structural member, Fig. 3 is a sectional view showing a step in the process of joining the two members together, Fig. 4 is a perspective view partly in section, of a metallic structural member made in accordance with the invention, and Fig. 5 is an elevational view of a portion of a beam constructed in accordance with my invention.

Referring to the drawing, in Fig. 2 there is shown an element in making a metal structural member, which comprises a sheet metal plate 1 having an aperture 2 therein along the longitudinal center line thereof. Surrounding the aperture 2, the plate has a right angularly directed flange 3 provided with an inturned portion 4.

The edges of the plate have flanges 5 bent at right angles in the direction opposite to the flanges 3, the flanges 5 being provided with inturned portions 6.

In Fig. 1 is shown an element comprising a plate 20 having an outturned flange 21 provided with an inturned portion 22. Along the longitudinal center line thereof the plate 20 is provided with a concave portion 23 which has the edges thereof encircled by a flange 24 having a right angularly directed portion 25 connected to a flange 26 at right angles to plate 20.

In joining the elements of Figs. 1 and 2 together, the concaved portion 23 and the flange 24 are inserted in aperture 2 so that the portion 25 abuts the inturned portion 4 of flange 3. Now, by the use of tools bearing against flange 24 and the concave portion 23, the concave portion 23 is straightened out and flange 24 is caused to abut the inturned portion 4 of flange 3 as shown in Fig. 4, thus tightly joining the two elements together to provide a rigid and permanent joint.

From the above description it will be seen that there has been provided a rigid joint for permanently securing the two elements of the metallic structural member together. The securing operation obviously is simple and can be quickly accomplished. In making a metallic structural member for building construction, the plate 1 is provided with a plurality of apertures such as 2, and the structure of the plate surrounding each aperture and the manner of joining the plates at each aperture is the same as above described.

While the apertures are shown in the drawing as being circular and arranged along the longitudinal center line of the structural member, it is obvious that the apertures can be of other shapes and arranged in manners other than along the longitudinal center line without departing from the spirit of this invention.

The foregoing disclosure is to be regarded as descriptive and illustrative only, and not as restrictive or limitative of the invention, of which, obviously, embodiments may be constructed including many modifications, without departing from the spirit and scope of the invention herein set forth and denoted in the appended claims.

Having thus described my invention, what I claim as new and desire to secure by Letters Patent, is:

1. In a structural member for building construction, a first metal plate and a second metal plate spaced apart, said first plate having a plurality of apertures, right angularly directed flanges surrounding said apertures and having right angularly inwardly directed portions, said second plate having right angularly directed flanges passing through said apertures and bent around and abutting both sides of said inwardly directed portions, and plates integral with said flanges closing said apertures.

2. In a structural member for building construction, a first metal plate and a second metal plate spaced apart, said first plate having a plurality of spaced apertures, right angularly directed flanges surrounding said apertures and having right angularly inwardly directed portions, right angularly directed flanges on said second plate passing through said apertures in said first plate and having portions bent around and abutting both sides of said inwardly directed portions of said first plate, and plates integral with the flanges on the second plate closing said apertures, said plates being parallel to the inwardly directed portions of said first plate, and abutting the bent portions of the flanges of the second plate.

ALBERT RAFTER.